United States Patent [19]

Bays

[11] Patent Number: 4,485,889
[45] Date of Patent: Dec. 4, 1984

[54] VALVE MEANS FOR COMPRESSED AIR POWERED ACOUSTIC PULSE GENERATOR

[75] Inventor: Marvin G. Bays, Ponca City, Okla.

[73] Assignee: Atlantic Richfield Company, Los Angeles, Calif.

[21] Appl. No.: 336,530

[22] Filed: Jan. 4, 1982

[51] Int. Cl.³ .............................................. G01V 1/147
[52] U.S. Cl. ...................................... 181/121; 124/56; 181/117; 181/401
[58] Field of Search ................ 367/144, 189; 181/113, 181/114, 117, 118, 121, 401; 251/333, 334, 335 R, 365; 91/394; 124/56

[56] References Cited

U.S. PATENT DOCUMENTS

| | | | |
|---|---|---|---|
| 928,181 | 7/1909 | Clement | 91/394 |
| 1,053,304 | 2/1913 | Gendre | 91/394 |
| 4,284,165 | 8/1981 | Airhart et al. | 181/117 |
| 4,402,381 | 9/1983 | Airhart | 181/114 |

Primary Examiner—Nelson Moskowitz
Assistant Examiner—K. R. Kaiser
Attorney, Agent, or Firm—Robert M. Betz

[57] ABSTRACT

A movable inner cylindrical valve member is rigidly attached to the upper end of an air powered impact projectile designed for striking a target to produce an acoustic pulse. By seating upwardly within the bore of a fixed outer valve member against spaced apart tapered valve faces, the cylindrical wall of the inner valve member covers intermediate air pressure ports in the bore wall. In operation, the axial separating movement between the inner and outer valve members will instantly admit air pressure adjacent the closed end of the bore of the outer valve member in order to exert an accelerating force to drive the projectile. At the same time, the operation of this valve can be made essentially pressure independent by proper selection and placement of the annular seals which contact the valve faces.

4 Claims, 4 Drawing Figures

VALVE MEANS FOR COMPRESSED AIR POWERED ACOUSTIC PULSE GENERATOR

BACKGROUND OF THE INVENTION

1. Field of the Invention

This invention relates generally to the field of air valves and more particularly to the use of such valves in connection with compressed air powered acoustic pulse generators.

2. Description of the Prior Art

U.S. Pat. No. 4,284,165 issued Aug. 18, 1981 to Airhart, et al. describes generally an apparatus for generating an acoustic pulse wherein an impact piston upwardly latched in a firing position is powered downwardly by compressed air or gas to strike a target plate positioned against the earth. The compressed air is admitted into the piston housing through ports penetrating the housing side wall near its top. The upper portion of the piston is tapered and in its upward or firing position, as supported by means of an electrically controlled latch or latches, is designed to press against static seals on the correspondingly tapered portion of the housing bore above and below the side wall ports. Since the tapered wall of the piston is continuously exposed to air pressure, a positive breakaway force is exerted downwardly at all times upon the piston. The tapered piston wall also insures that air pressure is released within the housing bore to drive the piston downwardly the instant the piston disengages the side wall seals.

Although the above-described positive breakaway force has the advantage of ensuring a positive piston release, it necessarily applies a load tending to impede the smooth, repeatable operation of the latch, whether the support is from the bottom or the top. This force is in addition to that produced by the dead weight of the piston mass. It has been found that as the applied air pressure is increased, the time required for latch disengagement begins to become erratic. This in turn means that even if the applied air pressure is maintained constant, the elapsed time between the electrical signal and target impact will vary. In seismic work, it is frequently desirable to fire a group of seismic sources simultaneously in order to increase the strength of the acoustic pulse to be injected into the earth. In such cases, a few milliseconds variation in the instant of target impact of multiple sources will seriously degrade informational content and proper interpretation of the seismic reflections. The greater the applied air pressure, the greater these variations tend to become.

It is therefore a general object of this invention to provide a compressed air powered acoustic generator with improved means for controlling the initiation of a firing operation.

It is a further object of this invention to provide a compressed air powered impact-type acoustic pulse generator of the type described with highly reproducible timing characteristics over a range of applied air pressure.

Other objects and advantages of this invention will become apparent from a consideration of the detailed description to follow taken in conjunction with the accompanying drawings and the appended claims.

SUMMARY OF THE INVENTION

An air valve is described for use in an acoustic signal generator wherein compressed air is utilized to accelerate an impact projectile to strike a rigid target. The valve means generally comprises a fixed outer valve member having a circular bore of varying diameter decreasing from its open end to its closed end and a second complementary movable inner circular valve member adapted to be seated axially therein. The bore of the fixed valve member includes first and second spaced apart frusto-conical annular seating surfaces, situated adjacent said closed and open ends respectively, the lower base of the first frusto-conical surface being interconnected with the upper base of the second frusto-conical surface by an intermediate cylindrical bore section provided with one or more continuously open air pressure ports connected to a supply of compressed air. The movable valve member is provided with first and second spaced apart frusto-conical faces for complementary axial engagement with the corresponding first and second seating surfaces by means of a pair of annular seals. A cylindrical portion of said movable valve member intermediate such seals is continuously exposed to air pressure through the air pressure ports in said position of engagement. The larger diameter end of the inner valve member is adapted to be integrally connected with an impact projectile normally supported or latched so that the air valve is closed. Immediately upon release of the projectile in a firing operation, the seals disengage, the valve opens and compressed air is admitted between the closed end of the bore and the smaller diameter end of the movable valve member to accelerate the projectile toward the target. By making the effective sealing diameters of the seals substantially equal, the initiation of valve operation becomes essentially pressure-independent, while taking advantage of the fast, friction-free seal disengagement provided by the tapered seating feature.

DETAILED DESCRIPTION OF THE PREFERRED EMBODIMENTS

Figure 1:
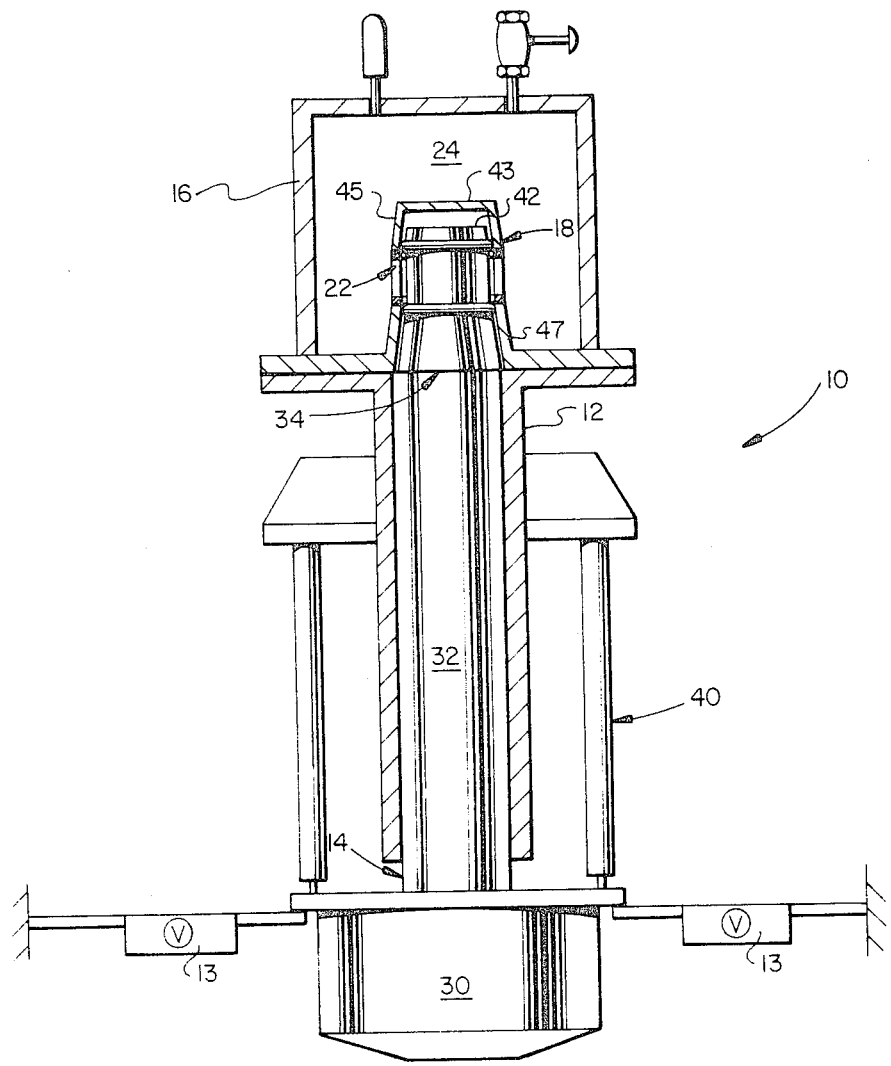
FIG. 1 is a vertical sectional view of an acoustic pulse generator, partially diagrammatic, incorporating air valve means in accordance with a preferred embodiment of this invention.

Referring now generally to FIG. 1, there is illustrated a preferred embodiment of this invention. An acoustic pulse generator 10, of the type generally described in U.S. Pat. No. 4,284,165 referenced above, includes an open-ended upstanding cylindrical housing 12 within which an impact projectile 14 may be supported in a firing position by means of quick release electrically controlled latch means 13. A container of compressed air or gas 16 is positioned over housing 12, so that a fixed outer valve member 18 may project upwardly therein. The bore of valve member 18, closed at its upper end, constitutes effectively an extension of the bore of housing 12. A plurality of continuously open ports 22 in the sidewall of valve member 18 penetrate its bore so as to provide a gas flow path therein for compressed gas 24 within container 16. Projectile 14 consists generally of a bottom impact mass 30 fixed to the lower end of piston rod 32 and a movable male valve member 34 fixed to the upper end of piston rod 32. As shown, projectile 14 is drawn upwardly within housing 12 by means of hydraulic cylinders 40, so that the tapered or frusto-conical faces of valve member 34 move axially to engage the complementary tapered or frusto-conical seating surfaces of the bore of valve member 18. As will be explained in further detail in what follows, in operation, projectile 14 is released by a firing signal. This may be accomplished, for example, by an electrical signal which disengages solenoid controlled latches 13. When this occurs, valve member 34 immediately drops from and disengages valve member 18, providing a path for compressed air 24 between the top surface 42 of valve member 34 and the closed upper end 43 of first valve member 18. This, in turn, unleashes a powerful accelerating force which, in combination with the weight of projectile 14, drives it downwardly to contact a target (not shown).

Figure 2:
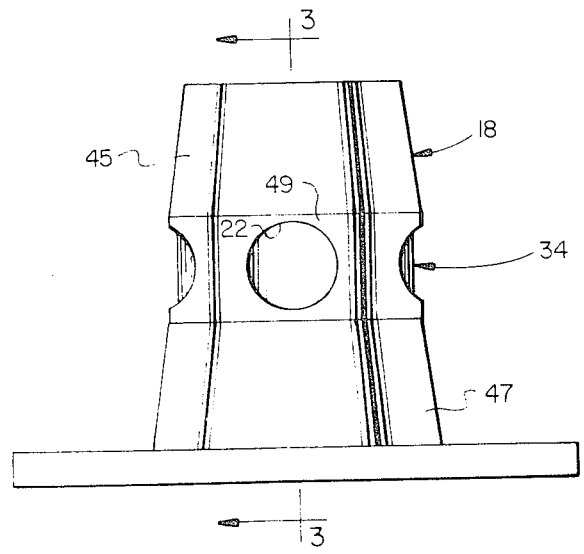
FIG. 2 illustrates a detailed elevational view of air valve means in accordance with the preferred embodiment of this invention shown in FIG. 1.
Figure 3:
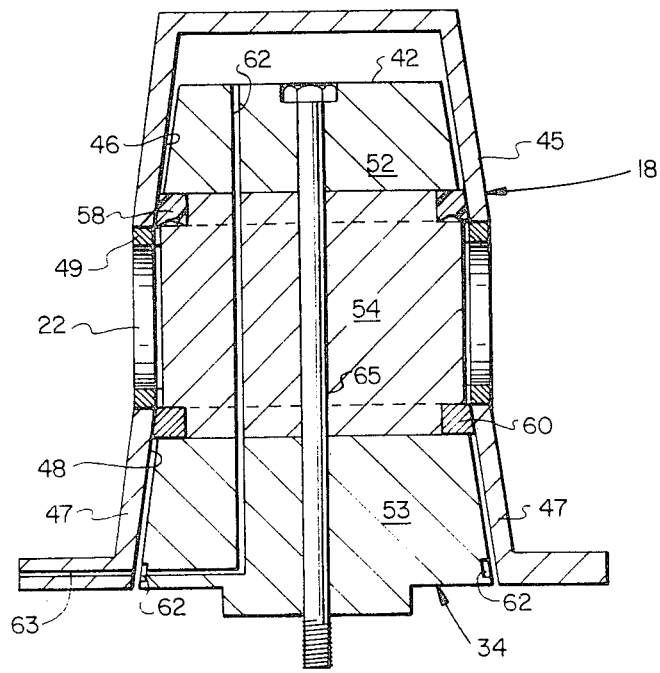
FIG. 3 is a detailed sectional view of the air valve means of this invention taken along the line 3—3 in FIG. 2.

The construction of the valve mechanism proper consisting generally of valve member 18 and valve member 34 is best understood by reference to FIGS. 2 and 3. Valve member 18 comprises generally a first frusto-conical or tapered valve section 45 defining a similarly configured seating surface 46 and a second frusto-conical valve section 47, defining a like configured seating surface 48, which are separated by an intermediate cylindrical section 49, which interconnects the lower base of section 45 with the upper base of section 47. One or more ports 22 penetrate the sidewall of section 49 so as to provide an air or fluid path into the bore of valve member 18.

Valve member 34 defines generally a first frusto-conical valve face 52, a second frusto-conical valve face 53 and an intermediate cylindrical surface 54, which is integral with and interconnects faces 52 and 53. The tapered valve faces 52 and 53 are complementary with and adapted to engage the correspondingly tapered valve seats 46 and 48, respectively. Valve member 34 is provided with upper and lower annular seals 58 and 60 recessed within surface 54, which are spaced apart so as to make contact with the respective valve seats 46 and 48 above and below ports 22. In a preferred embodiment, seal 58 is of the self-sealing, deformable lip type, such as sold under the trademark PolyPak ®. In such an embodiment, lower seal 60 is preferentially a rigid material, such as bronze, whose sealing or contact edge is beveled to the same angle of taper as the complementary valve seat 48. When valve member 34 is so seated, air pressure applied through ports 22 will expand seal 58 to form an airtight seal against seat 46, preventing air pressure from reaching top valve surface 42. Since seal 58 is deformable, the actual stopping point of valve member 34 will be precisely and repeatably determined as the point at which seal 60 makes contact with seat 48. With a small included angle of taper for seat 48, such as, for example, five degrees, seal 60 may wedge slightly into seat 48 to insure a truly hermetic bottom seal. If surface 54 of valve member 34 is right cylindrical and, if in addition, the average diameter or exposed area of seals 58 and 60 is the same, it is evident that the constant force in a downwardly direction on valve member and hence, projectile 14 is solely a function of the weight of the movable components and is independent of the applied air pressure. Conversely, if the driving air pressure 24 (FIG. 1) were permitted to continuously "load" the valve, it has been determined experimentally that with increase in such pressure the increased static loading on latch 13 (FIG. 1) could cause it to operate in an erratic fashion because of misalignment, friction, etc. This, in turn, could make it difficult to precisely control the repeatable interval (for example to within +1 ms) between the electrical firing signal and the actual initiation of the downward motion of projectile 14. But with the arrangement of this invention a series of acoustic generators of the type described activated simultaneously will also initiate acceleration of their respective projectiles downwardly substantially simultaneously, without regard to the pressure of their respective air supplies. At the same time, the quick breakaway advantage of the tapered valve seats 46 and 48 is retained in order to insure that the critical time interval is short and unaffected by sliding friction effects within the valve itself.

If any air leaks upwardly within valve member 18 past seal 58 in its engaged position prior to valve operation, it is vented to atmosphere through vent passage 62 extending from top surface 42 through sections 52 and 54 and communicating with circular groove 63 in action 53, which is in turn adapted to register with vent passage 63 through valve section 47. In like manner, air leakage downward past seal 60 is also vented through passage 63 to avoid pressure buildup at the lower end of piston rod 32. In order to insure proper registry of sections 52, 53, and 54 with each other and with piston rod 32, these components may be interconnected by means of a plurality of counter-sunk cap screws, such as cap screw 65 as shown.

Within the scope of this invention, it is apparent that the degree of taper of the frusto-conical valve seats 46 and 48 need not be equal. For example, to enhance rapid breakaway of valve member 34, the degree of taper of valve seat 46 may be increased. It should also be understood that within the scope of this invention seals 58 and 60 may be replaced by corresponding seals recessed within the tapered surfaces of seats 46 and 48.

Figure 4:
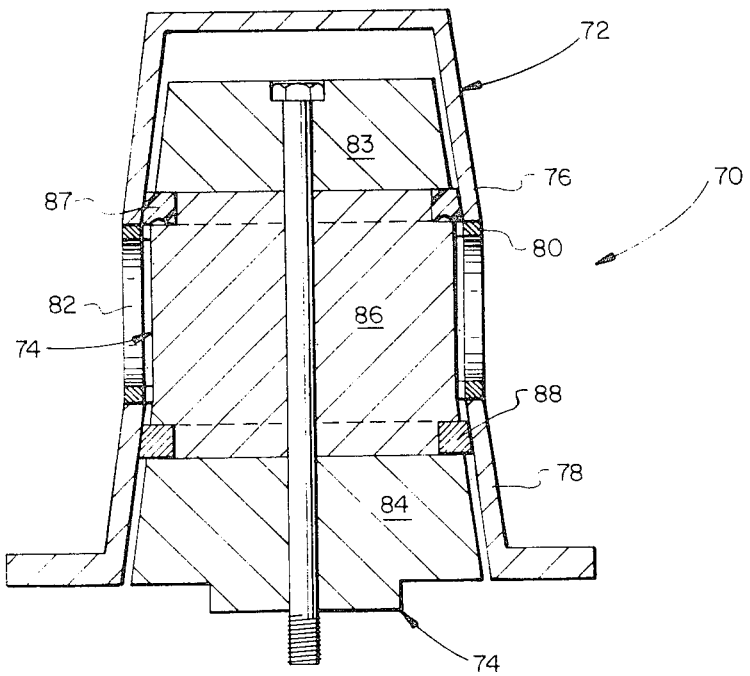
FIG. 4 illustrates a detailed sectional view of air valve means in accordance with an alternate embodiment of this invention.

In the alternate embodiment of FIG. 4, valve 70 comprises fixed female valve member 72 and male valve member 74. In this embodiment, valve member 72 is provided with an upper frusto-conical section 76, and lower frusto-conical section 78 separated from each other by cylindrical section 80 which is penetrated by pressure ports 82. The valve member 74 comprises an upper frusto-conical section 83, lower frusto-conical section 84 and intermediate cylindrical section 86. As contrasted to the embodiment of FIG. 3, the lower rigid seal 88 is located slightly below the top of frusto-conical section 78. In this way, a differential area between seal 87 and seal 88 may be incorporated to provide an intentional net force downward due to air pressure entering the bore of member 72 through ports 82. This net force downward may be just great enough to ensure that the wedging action, if any, of seal 88 against section 78 does not affect precise initiation timing. As a result, a truly hermetic seal can be insured both above and below ports 82. Since any leakage of air pressure before firing will also interfere with simultaneous operation of multiple generators, such hermetic seals can be quite important. By constructing valve member 74 of interconnecting sections 83, 84 and 86, such sections may easily be replaced in the field by other similar valve sections which are modified in configuration to accentuate or reduce the breakaway pressure described.

What has been described is illustrative only of this invention. Further modifications in the arrangement of the component parts of this apparatus will occur to those skilled in this art without departing from the scope of the invention as set forth in the appended claims.

What is claimed is:

1. In an acoustic signal generator wherein compressed air is utilized to accelerate an impact projectile into a rigid target, a quick release air valve comprising:
    (a) a fixed outer valve member having a straight, circular bore, of decreasing diameter, the smaller end of which is closed, said bore comprising first and second frusto-conical spaced apart valve seats, situated respectively adjacent its closed and open ends, the lower base of said first valve seat being interconnected with the upper base of said second valve seat by an intermediate right cylindrical bore surface penetrated by an air pressure port;
    (b) a source of compressed air operatively interconnected with said air pressure port; and
    (c) a movable inner valve member rigidly attached to said projectile and adapted to fit axially within the bore of said fixed valve member, said movable valve member being provided with first and second frusto-conical spaced apart valve faces adapted to be guided into complementary sealing engagement with said first and second valve seats respectively, said valve faces being interconnected by an intermediate right cylindrical surface of said movable valve member, whereby in response to an axial separating movement between said fixed and movable valve members, said first and second valve faces are simultaneously disengaged from said first and second valve seats respectively so that the air pressure exerted continuously against said cylindrical surface of said valve member through said ports is admitted within said bore between the closed end thereof and the adjacent end of said movable valve member so as to drive said projectile.

2. Apparatus as in claim 1 wherein said first frusto-conical face of said movable valve member is provided with a deformable annular seal, and wherein said secod frusto-conical face of said movable valve member is provided with a rigid annular seal, said deformable and rigid annular seals being adapted to make contact with said first and second valve seats respectively so that said deformable and rigid annular seals are continuously exposed to said air pressure.

3. Apparatus as in claim 2 wherein the average area of said deformable and rigid annular seals exposed to said air pressure in the engaged position thereof is substantially equal.

4. Apparatus as in claim 2 wherein said exposed area of said rigid seal is greater than that of said deformable seal by a predetermined extent.

* * * * *